Dec. 8, 1931. W. L. MORRIS Re. 18,278
GREASE FEEDER
Original Filed Aug. 7, 1916 3 Sheets-Sheet 1
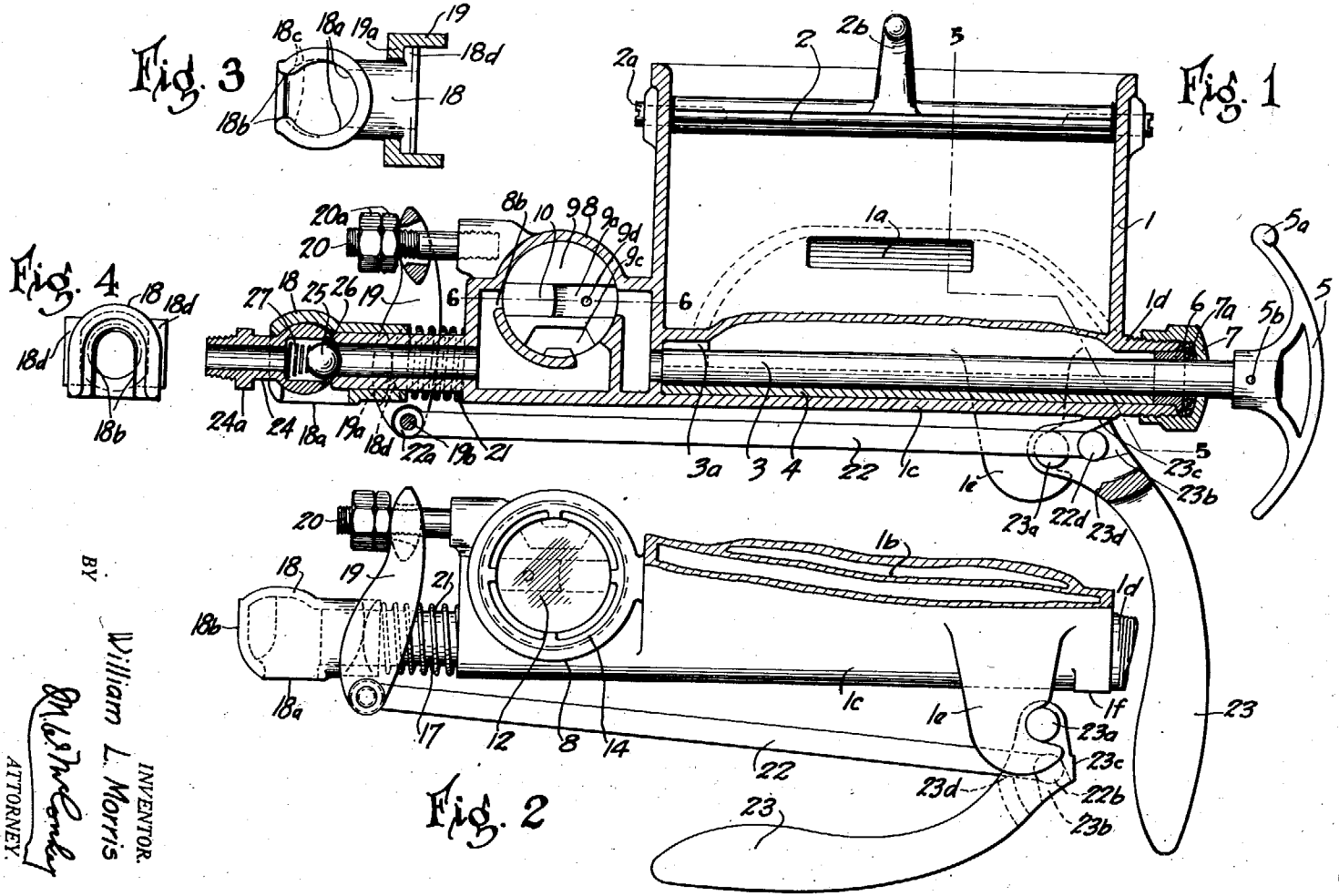
INVENTOR.
William L. Morris
BY
ATTORNEY.

Dec. 8, 1931. W. L. MORRIS Re. 18,278
GREASE FEEDER
Original Filed Aug. 7, 1916 3 Sheets-Sheet 2
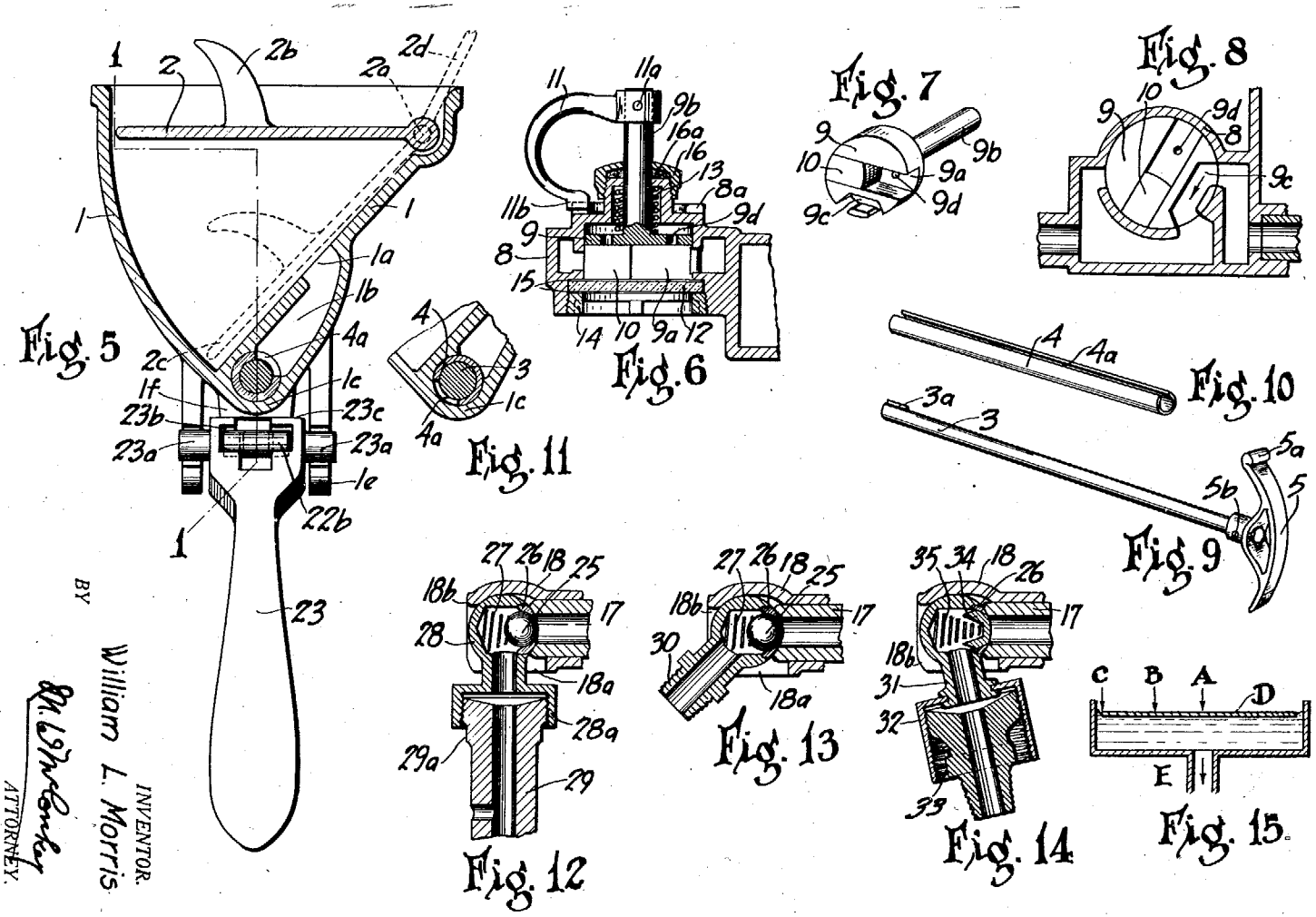
INVENTOR.
William L. Morris
BY
M. W. McCorkey
ATTORNEY.

Dec. 8, 1931. W. L. MORRIS Re. 18,278
GREASE FEEDER
Original Filed Aug. 7, 1916 3 Sheets-Sheet 3
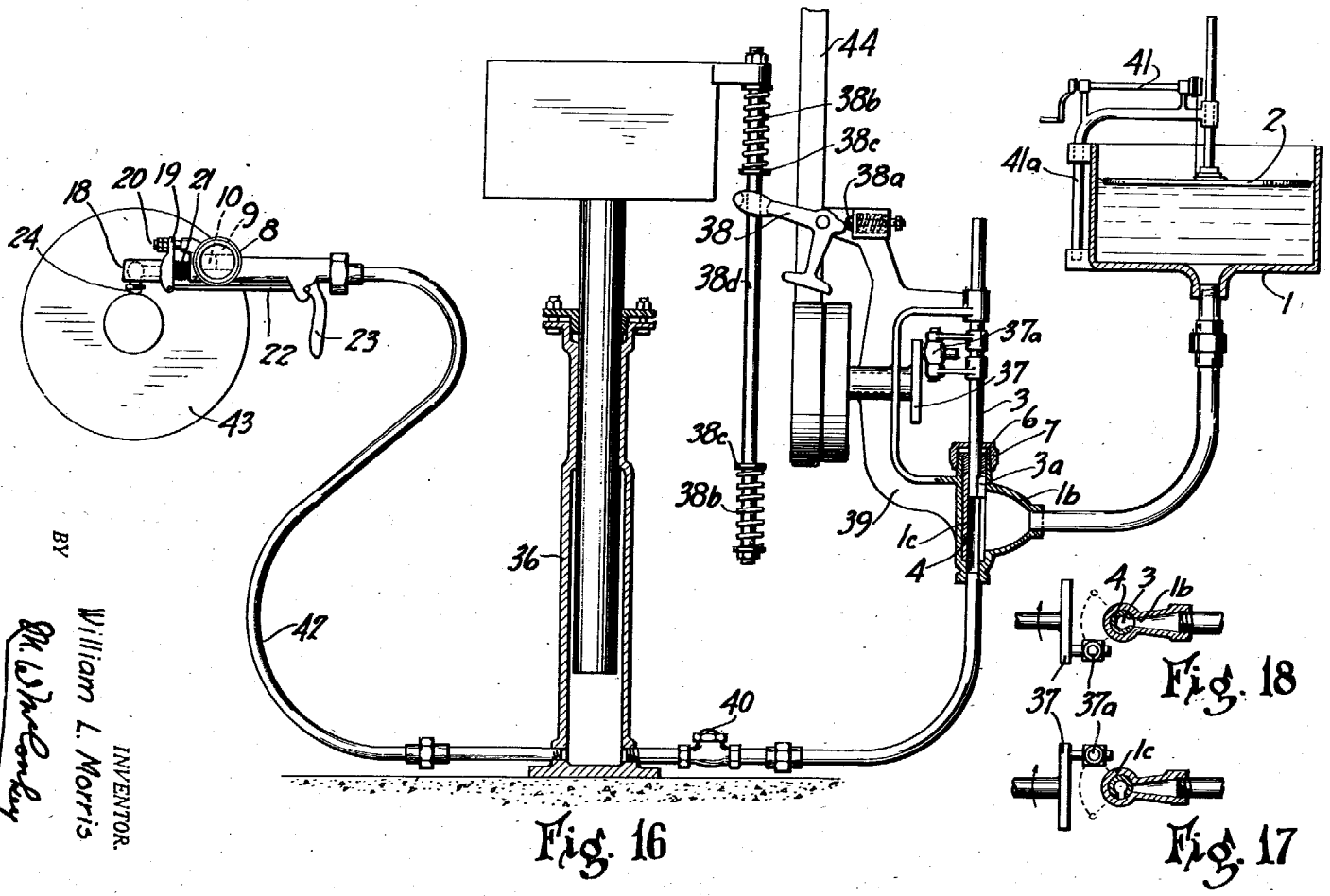
INVENTOR.
William L. Morris
BY
M. W. McConkey
ATTORNEY.

Reissued Dec. 8, 1931

Re. 18,278

UNITED STATES PATENT OFFICE

WILLIAM L. MORRIS, OF WILMETTE, ILLINOIS, ASSIGNOR TO BENDIX AVIATION CORPORATION, OF NEW YORK, N. Y., A CORPORATION OF DELAWARE

GREASE FEEDER

Original application filed August 7, 1916, Serial No. 113,653, Patent No. 1,749,830, dated March 11, 1930. Divided and application filed May 5, 1928, Serial No. 275,540. Original No. 1,756,657, dated April 29, 1930. Application for reissue filed March 20, 1931. Serial No. 524,120.

This application is a division of my application Serial No. 113,653, filed August 7, 1916, for grease feeders.

This invention relates particularly to a grease feeder for filling the grease cups of an automobile but of course it may have a more general application wherever it may be used. The principal object of the invention is to provide a grease feeder with which the grease cups or devices may be filled without any loss of grease and in the quickest possible time.

A successful grease feeder should be able to accomplish a number of important results; it should be of such construction that a central system could be employed feeding grease from a pipe line under pressure or a hand operated system, both of which can be easily and quickly attached and successfully used. A central system should be able to fill four or five grease cups a minute; a hand system should be able to fill two or three cups per minute. Either the hand or the pressure feed should be arranged to feed a predetermined amount at each feeding; the central system at about 200 pounds pressure, the hand system at about 50 to 75 pounds pressure, both systems having means of showing whether the grease has been fed. Any feeder should have such a construction that grease is prevented from oozing out when disconnected from the grease cup due to the air re-expanding, and there must be no pressure at the discharge connection when the grease feeder is detached. The connection to which the grease feeder is attached should permit of connection from any one of several angles on account of the many positions in which cups are placed on a car. The form of grease feeder should be such that an exact alignment of the feeder is not necessary in order to make the connection; the form of grease feeding connection should be one which will permit a considerable movement of the grease feeding device without imposing too great a strain on the small connections of the grease cups. The attachments for the grease cups should be uniform in size so that the feeder can readily be attached thereto regardless of the size or make of the grease cup itself. These are only a few of the requirements for a successful grease feeder and the present device is believed to answer all these requirements and many others as will hereinafter be set forth.

The invention consists in the features of novelty in the construction, combination, and arrangement of the several parts.

In the accompanying drawings, Figure 1 is a longitudinal section taken on the line 1—1 of Figure 5; Figure 2 is a view in elevation of the lower part of the construction shown on Figure 1; Figure 3 is a view looking at the under side of the movable clamp member; Figure 4 is an end view of the movable clamp member; Figure 5 is a transverse section taken on the line 5—5 of Figure 1; Figure 6 is a plan section of the measuring device taken on the line 6—6 of Figure 1; Figure 7 is a perspective of the rotatable measuring member and its transversely movable plug; Figure 8 shows the measuring device of Figure 7 with its by-pass in communication; Figure 9 is a perspective of the hand plunger; Figure 10 is a perspective of a rotatable sleeve valve; Figure 11 is a cross sectional view through the plunger and sleeve when the grease port is shut off; Figure 12 shows one grease plug attachment; Figures 13 and 14 show other forms of grease plug attachments at different angles; Figure 15 is a diagrammatic view illustrating grease handling by suction; and Figures 16, 17 and 18 are views showing a power grease feeder.

This device is intended to store a quantity of grease and then deliver it in small quantities to different bearings or grease cups, and instead of the grease storage being in each of the several grease cups which must be screwed down to feed the grease, the storage is in the feeder. Also, instead of feeding grease from the grease cups by manipulating them and refilling them when empty, this device is attached directly to the bearing to be supplied with grease and the grease is fed from it, the grease feeder being refilled instead of the cups. It is difficult to feed grease slowly and automatically for a considerable time, particularly with a device like the ordinary grease cup and it is for such bearings as require only a small amount of grease that this device is particularly suited. Grease cups become fouled with dirt and impurities so that they are difficult to manipulate and when there are many cups there is much labor involved in adjusting and filling them. Another purpose of this device is to save labor, however it will also save grease and avoid admitting much of the dirt and impurities that get into separate grease cups. This feeder can be quickly attached, the grease forced to the bearing, and the feeder detached. The various details employed are chiefly for the purpose of saving labor.

This feeder comprises an attaching device, a grease feeding mechanism, a quantity measuring mechanism, and a grease storage and suction feeding mechanism. In some cases the entire combination of devices is necessary, while in some other cases a power pump may be used to supply grease under pressure in connection with the attaching and measuring mechanisms.

Grease is a peculiar substance to handle and until its characteristics are pointed out, the new and novel details employed in this device will not be sufficiently appreciated. Grease being a solid or rather a semi-solid, more or less plastic, will not flow unless it is forced by pressure. If suction is applied to a chamber or receptacle containing grease, air will pass through the grease where there is the least resistance. If air is prevented from entering at the point of least resistance then the suction will be greatest at this point and by increasing the length of travel that the air would have to take, the greater will be the suction at points of least resistance which are covered actually to prevent air from entering. This may be more clearly shown by referring to Figure 15 in which the disk D is forced down on the grease in a suitable receptacle to exclude air from the mass of grease so that the pressure per unit of area at the point A would, when suction is applied to the outlet E, be much greater than necessary to move the grease, gradually becoming less at the point B and the lowest possible pressure at the edge of the disk C; really less than that required to move the grease. Stating this a different way, it is the combined pressure on the entire disk D caused by the suction that is sufficient to withdraw the grease, but the pressure at the edge of the disk is too low for air to pierce thru the body of the grease. Thus, although the grease may be almost entirely removed from such a receptacle by suction, the length of travel of the air thru the grease would be so great that more pressure would be required to puncture thru the grease than to withdraw it from the suction opening.

Another consideration in handling grease is the difficulty of keeping air out of the grease container; such air as would be encircled or pocketed by grease while placing it in the container. When air and grease are confined together the measuring device will not measure accurately; furthermore, the pockets of air re-expand when suction and pressure are alternated, and when detaching the feeder from the bearing the compressed air may eject grease at the connecting fittings. The shallower the container and the larger its filling opening, the less air will be pocketed while filling the container with grease. It is further desirable to employ the form shown to serve this valuable purpose for the form of the container makes it possible to insert or fill it with grease without pocketing air, the form and shape of the lid or cover making it practicable to suck grease from the container without air piercing thru the grease. This device also relieves pressure on the grease at the point of connection before disconnecting therefrom.

In feeding grease to different bearings some will require much pressure to force it into the bearings while others will require very little pressure. When only a small amount of grease is to be supplied no hand opening or closing of a valve or hand control of the amount of movement of the grease forcing ram can be relied upon to measure out a predetermined quantity of grease. It requires a device that will measure in cubical contents at any pressure or velocity, positively closing when the predetermined amount has been measured.

To prevent grease from escaping at the connecting members it is necessary to have a self closing valve so that any confined pressure in the bearing will not eject grease when the parts are separated, or when the joint is disconnected. The pressure at the grease feeder connection, that is, at the end of the feeder itself should first be below atmospheric pressure to prevent the grease from escaping from the open end of the feeder and the feeder should then be opened to the atmosphere before disconnecting it; this insures that the pressure is not above the atmosphere so it will discharge grease, and at the same time not enough below the atmospheric pressure to draw grease back into the feeder and allow air to enter which might be forced into the next bearing filled. It has been shown in practice that the feeder herein shown and described will do all of the above things and answer all of the requirements for a successful grease feeder.

In the accompanying drawings the numeral 1 designates generally the grease receptacle having the form shown in cross section in Figure 5 throughout its entire length as shown in Figure 1. This grease receptacle has an opening $1^a$ thru which grease is sucked from the receptacle, the sides of the opening being spaced, from the points where air may enter, approximately the same amount or distance in all directions. The resistance against air leakage is made as near the maximum as possible for all points. From the opening $1^a$ a passage $1^b$ extends forming the grease inlet to the cylindrical port on $1^c$ of the receptacle casing. A lid or cover 2 is pivoted at one side of receptacle 1 on a pivot $2^a$ and serves a far more valuable purpose than merely to keep dirt out of the grease receptacle. The cover or follower is pressed down firmly on the grease after the receptacle has been filled thereby forcing air and some grease outwardly around the edges but leaving the contents of the receptacle solid grease from which air has been excluded with the cover bearing firmly upon it. A handle $2^b$ affords means for raising and lowering the cover which is shown in Figure 5 by the dotted outlines $2^d$ in its raised position and by the dotted outline $2^e$ in almost its lowest position.

Rotatable in a cylindrical portion $1^c$ of the feeder casing is a valve sleeve 4 having a longitudinal slot $4^a$ which extends its entire length. In this sleeve a ram or plunger 3 is movable which has at one end a block $3^a$ adapted to fit in the slot $4^a$ so that the outer radius of the block is the same as that of the sleeve. The plunger can therefore be moved longitudinally without moving the sleeve and when the plunger is rotated the sleeve rotates also. At the other end of the plunger is a handle 5 flat at one side but having a distinguishing scroll $5^a$ on the other to designate the position of the port in the sleeve valve 4. This handle is secured to the plunger by a pin $5^b$. At the outer end of the plunger is a retained gland 6 positioned close to the outer end of valve sleeve 4, allowing only enough clearance so that the sleeve will rotate. This gland is formed with a shoulder to prevent its being pressed in against sleeve 4 and a packing nut 7 with interposed packing $7^a$ prevents leakage around the gland and retains the plunger and the sleeve 4 in place. In operation the plunger 3 can be withdrawn until the block $3^a$ comes in contact with the gland 6. The boss $1^d$ to which the gland and packing nut are attached is shown as an integral part of the receptacle 1. The bore at the discharge end of the cylinder is sufficiently smaller than the diameter of the valve sleeve 4 to provide a shoulder against which this end of the sleeve abuts and rotates and also form a stop against which the inner end of piston 3 may contact to limit its travel in this direction.

The casing of the measuring device is designated generally by the numeral 8 and may be a separate and distinct part attached to the receptacle 1 instead of an integral part as shown in Figure 1. In this casing 8 is a bore in which a rotatable member 9 is movable. This member 9 has a slot $9^a$ into which the grease passes to be measured, and a measuring block 10 slidable therein, the length of the block determining the amount of grease to be ejected with each half turn of the member 9. The stem $9^b$ extends to the outside of the measuring device to permit movement thereof. To this stem a handle 11 is attached by means of a pin $11^a$, with a lower extremity $11^b$ adapted to make contact with stops $8^a$ projecting from the casing.

In front of the rotatable member 9 is a glass disk 12 against which the rotatable member 9 is pressed by means of a spring 13. The glass disk is held in place with a retaining ring 14 and made tight with packing rings 15. The stops $8^a$ at the back of the measuring device are so placed that the lever 11 can be turned half way and back again to make the ends of the slot $9^a$ register with openings in the casing 8 for discharging the grease. A packing nut 16 and packing $16^a$ prevents leakage around the stem $9^b$. This measuring device has a by-pass $9^c$ whereby the grease which passes through need not be measured. This by-pass port $9^c$ can be turned to the position shown in Figure 8, thereby shutting off the port or slot $9^a$. In releasing the lower end $11^b$ of the lever 11 from engagement with stops $8^a$, the rotatable member 9 is moved away from the glass disk 12, compressing the spring 13 and allowing the end $11^b$ to ride on top of the stops $8^a$ until the position shown in Figure 8 is reached. If this position is to be maintained for some time, the stops $8^a$ would be notched at the by-pass position so that the rotatable member 9 will be locked in this position and allowed to return to its normal position against the glass 12. In the bottom of the slot $9^a$ of this member 9 are holes $9^d$ for relieving pressure between the rotatable member 9 and the casing 8 when the rotatable member is drawn back to disengage its handle from the stops.

When the floating piston or plug 10 is at one end of the slot $9^a$ as shown by Figure 1, it closes a discharge passage $8^b$; the piston is larger than the passage and closes over it tightly, much the same as a check valve. In Figure 2 the rotatable member 9 is turned half way around with the piston or plug 10 in the same position in slot $9^a$, as it was in Figure 1 and ready to take its travel of a stroke and eject as much grease as lies between the piston and discharge passage $8^b$. The glass sight 12 shows clearly the position of the piston, at all times, and whether grease has traveled through the measuring port, and also shows if air is in the charge of grease. The quantity of grease discharged each stroke can be varied by varying the length of the floating or reciprocating piston 10.

At the discharge end of the measuring device casing is a nozzle 17 in communication with the passage $8^b$ and with the discharge from the by-pass $9^c$ so that either a measured or unmeasured quantity of grease can be discharged therefrom. Slidable on this nozzle is a clamping member 18 which has an attaching extremity $18^a$ open from below and a reduced opening $18^b$ at the end shown by Figures 3 and 4. These openings are proportioned to receive a spherical end of a ball fitting 24 as shown in Figure 1, so that the fitting may be clamped between the member 18 and the end of nozzle 17, a spherical bearing face $18^c$ being formed in the clamping member as shown in Figure 3 and the end of the nozzle 17 having a spherical seat.

Extending from the clamping member 18 are ears $18^d$ as shown in Figures 1, 3 and 4 by which the member may be pulled toward the nozzle 17. A pull lever 19 has legs $19^a$ which bear against the ears $18^d$, the lever being like an inverted U with the upper end loosely engaged by the stud 20 upon which are adjusting nuts $20^a$. The ears $18^d$ (Figure 4) fit between the legs of the lever 19, which extend down over the nozzle 17 and are provided at the lower ends with holes through which a pin $19^b$ extends. Ears $18^d$ are straight sided and may engage the inner sides of the legs of the lever 19, thereby preventing the clamping member from rotating out of position. For nearly all connections, the clamping members 18, 19, 22 and 23 bear only on one side of their bearing and a spring 21 is therefore placed at the nozzle end of the clamping member tending to keep bearings in contact. These connections can be made with full bearings at $23^a$ and would bear against the opposite sides of the different bearings dispensing with the spring, but this would not be as satisfactory as the construction shown.

A link or pull rod 22 has a long eye $22^a$ at one end, through which the pin $19^b$ extends, and the other end $22^b$ is T-shaped, forming a bearing part at each side. An operating lever 23 is formed with a pivot leg $23^a$ at each side, which has a bearing in recesses of legs $1^e$, preferably formed integrally with the bottom of receptacle 1. In this lever 23 are bearings $23^b$ for the T-headed extremities $22^b$ of link 22, so that the movement of the lever 23 carries the T-head past the line through the center of the eye $22^a$ of the pull rod and the bearing $23^a$ of the lever, until a shoulder $23^c$ of the lever 23 abuts a stop or projection $1^f$ on the bottom of the receptacle. The limit of travel in the other direction is determined by the engagement of a shoulder $23^d$ of the lever with the pull rod 22, as clearly shown in Figures 1 and 2.

An end ported fitting 24, clearly shown in Figure 1, has a threaded connecting end and a hexagonal portion $24^a$ for attaching it. In the port is a ball valve 25 pressed against a valve seat 26 by a spring 27. The seat 26 is inserted and held in a shouldered recess formed about the opening into the fitting. In Figures 12, 13, and 14 different forms of ball fitting are shown; the port of the ball or spherical fitting 28 is at the side in Figure 12 the numeral 29 designating generally a pin or bearing for receiving lubricant, with a grease cup end $29^a$ threaded into a fitting end $28^a$; in Figure 13, a member 30 is similar to the fitting shown in Figure 1 with the exception that the port is at 45 degrees to its longitudinal axis. In Figure 14 the ball fitting 31 has a port at a special angle, and has its lower end secured to a standard grease cup cap 32, the stationary part of the grease cup being designated as 33. In this last structure is a formed valve 34 having a pointed spring 35 bearing inside of the valve.

These modified forms are shown as they can all be used with a clamping device, the spherical form being superior to others, as it allows connection from almost any angle, and is easily cleaned or wiped off. Furthermore a slight movement of the grease feeder is permissible with the spherical connection without placing a strain on the fitting; the clamping member will slip on the ball up to a point such that it bears on the neck; the neck however, would be considerably smaller than the opening $18^b$ shown in Figure 4.

In operation, the cover 2 is raised to the position $2^d$ and, with a small paddle or putty knife, grease is placed in one side of receptacle 1, and as more is added and squeezed down into the receptacle, it is filled from one end to the other. This method of filling expels the air. When the receptacle is full, the cover is forced down firmly, squeezing out the top air together with some grease. The surplus grease is cut away with the putty knife and put back into the grease pail or barrel and the feeder is ready to use after first taking a stroke with the plunger 3 and discharging grease back into the pail to see that the grease is filled in solidly.

With a rag in right hand to wipe off outer end of attachments, and filler in left hand, the clamping member 18 is placed over a spherical connection and the clamp lever 23 is pulled up to its stop with the left hand. With the right hand the grease is drawn into the sleeve 4 by moving plunger 3 outwardly and with the scroll on handle $5^a$, standing up. At the end of the outward stroke the handle 5 is turned half way around with the scroll at bottom which closes the longitudinal port $4^a$, and the plunger is moved in, forcing grease from the sleeve into the measuring device. To disconnect, the lever 23 is pushed back with the left hand and clamping member 18 is disengaged ready to fill the next bearing.

If the measuring device is being used, then while going from one bearing to the next, the handle 11 is turned half way around against its other stop $8^a$. The grease will hold the cover 2 firmly by suction so it will not open even when placed upside down. When the receptacle is empty, the increased resistance will be noted when pulling out the plunger as the cover 2 would be at the end of its travel. Where much grease is to be handled, the plunger and receptacle would be stationary and much larger with flexible metallic hose run to the measuring and clamping device. The pump in this case would be power driven with a weighted accumulator arranged to cut out the pump drive when full and then throw it in when nearly empty, as shown by Figures 16, 17 and 18.

If a central service station system is used with a power pump to discharge the grease, the grease cups under the car, such as for brakes, rear axle swivel, universal joint, and the like, should point to such a position that a man in a cleaning pit beneath the car would find them easy of access. A piped pressure system for discharging grease requires a pump to create a pressure of about 200 pounds.

Grease cannot be readily placed in the small end of a long container, and when so placed, air is apt to be confined between each application of grease, while it is being pressed in. A shallow container with a large opening can be filled much more readily and air kept out entirely if grease is carefully placed so that a volume of air is not pocketed with the grease.

Where a certain movement, such as the travel of a ram determines the amount of grease fed, possibly no other device would be necessary. With either the hand or power form the measuring device should have a by-pass to permit an unmeasured quantity of grease to be discharged.

That part of the feeding device which is connected to the grease receiving projection or fitting should be of such construction that it can be quickly attached and detached, preferably by lever manipulation, as shown, rather than by a screw, and when the lever is drawn up tight it should hold to the fitting even if the hand is removed, for in the manipulation of the grease feeding plunger with one hand, the other would be unsteady, relieving pressure at the connection and allowing a leakage. The clamping device should have a limit to its clamping and releasing travel to avoid unnecessary strain on the parts. A wear take-up is required so that if there is not sufficient tension it can be readily adjusted, and when so set will not shift out of adjustment. The attachments are accurately made to an established form with very small allowance for variation. The adjustment of the clamping device is used to take up the wear in the parts, not to cover inaccuracy or variations in the parts. The present invention fulfills all of these requirements.

Although the feeder nozzle is rigid, great flexibility in use is obtained by the variable angle of attachment which is made possible by locating the port holes at various angles on the grease receiving fittings. This flexibility is different and separate from that produced by a flexible conduit but it enables an operator to engage fittings and to avoid obstructions which would otherwise be difficult of access.

I claim:

1. A grease feeder for detachable connection to a grease receiving bearing having a feeder projection comprising a slotted socket for making a detachable connection with feeder projections from a plurality of positions in different planes.

2. A lubricant feeder for a plurality of lubricant using bearings, each bearing having a projection with a port hole therein, and the port holes of different projections being located at various angles with the axis of the projection, comprising means for detachably and positively connecting the feeder to each of said projections so that the feeder will register with the port of said projection.

3. A lubricant feeder for detachable connection to a bearing for receiving lubricant, said bearing being provided with a lubricant receiving member having a round tip with a port opening therein in any one of a plurality of angles, and means for attaching the feeder to said round tip at an angle to communicate with the port thereof.

4. A grease feeder for a means for receiving grease having a ported spherical projection with a grease admitting port at any location on the sphere comprising a discharge nozzle and a connector movable relative to the nozzle and having an extremity adapted to fit over a spherical projection to connect the port thereof with the discharge nozzle.

5. A lubricant feeder for a mechanism having a plurality of bearings each provided with a ported projection in which the apertures to the ports are at different angular positions and in different planes relative to one another and having like contours of connecting faces at different port locations comprising, a feeder nozzle, and means in connection with the feeder nozzle for universally connecting it with a ported projection in any one of the different positions to register with the apertures thereof.

6. A grease feeder for detachable connection to a ported receiving device comprising means forming a spherical joint face adapted to be movably connected between the feeder and a receiving device to permit alteration in alignment of the feeder port in relation to a receiving device port, and mechanical means for holding the joint face of the feeder in contact with the receiving device.

7. A lubricant feeder for detachable connection to a ported receiving device comprising a spherical joint face to permit relative angular movement, and means for holding the joint face in contact with a receiving device to permit relative movement but insuring a tight joint bearing on the spherical surface.

8. A lubricant feeder for detachable connection to a bearing having a ported feeder connection member comprising means forming a spherical joint face between the feeder and a connection member with a port within the joint face, and a contact ring having a port therein, and means for holding these faces in contact through a range of varying angular positions with respect to the port openings within the ring of contact.

9. A lubricant feeder for a mechanism having a plurality of bearings each having a ported projection the axes of different ports in different projections being disposed at different angles with respect to the general axes of the projections, the projections having like contours of connecting faces at different port locations, comprising, a feeder nozzle, and means in connection with the nozzle for universally connecting it with a ported projection in any of the different positions to register with a port thereof.

10. A lubricant feeder for a mechanism having a plurality of bearings, each provided with a ported projection, each projection having a body portion, the port apertures of different projections being at different relative angular positions and in different planes with respect to the body portions of the projections, said projections having like contours of connecting faces at different port locations, comprising, a feeder nozzle and means in connection with the feeder nozzle for universally connecting it with any ported projection in register with the aperture thereof.

11. In a coupler for quick-detachably connecting a lubricant source with a ball-headed fitting, inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween said sleeves being relatively slidable, and means for sliding said sleeves relatively to one another.

12. In a coupler for quick-detachably connecting a lubricant source with a ball-headed fitting, inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, and means for urging said shoulder and seat relatively apart and relatively toward one another.

13. A coupler for quick-detachably connecting a lubricant source with a ballheaded fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, means for urging said shoulder and seat relatively apart, and means for urging said shoulder and seat relatively toward one another.

14. A coupler for quick-detachably connecting a lubricant source with a ball-headed fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, and means for relatively urging said shoulder and seat toward one another.

15. In a coupler for quick-detachably connecting a lubricant source with a ball-headed fitting, inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, means for urging said shoulder and seat relatively apart and means for urging said shoulder and seat relatively toward one another, one of the last said means being resilient.

16. In a lubricant feeder a nozzle comprising a tubular member having a discharge port and a contact portion surrounding the discharge port formed for a lubricant tight universal engagement with a lubricant receiving element.

17. In a lubricant feeder a nozzle comprising a tubular member having a discharge port and a contact portion surrounding the discharge port such as would be formed by the rotation of a curved line about an axis whereby to engage a cooperative surface of a lubricant nipple.

18. In a lubricant feeder a nozzle comprising a tubular member having a discharge port and a contact portion surrounding the discharge port such as would be formed by the rotation of a curved line about the axis of said tubular member whereby to engage a cooperative surface of a lubricant nipple.

19. In a lubricant feeder a nozzle comprising a tubular member having a discharge port and an outwardly flared contact portion surrounding the discharge port whereby to engage a cooperative surface of a lubricant nipple.

20. In a lubricant feeder a nozzle comprising a tubular member having a discharge port and a concave contact surface surrounding the discharge port whereby to engage a cooperative surface of a lubricant nipple.

21. In a lubricant feeder a nozzle comprising a tubular member having a discharge port and a concavely spherical contact surface surrounding the discharge port whereby to engage a cooperative surface of a lubricant nipple.

22. In a lubricant feeder a nozzle comprising a tubular member having a discharge port and an outwardly flared contact portion surrounding the discharge port and means for guiding the contact portion into cooperative relation with a lubricant receiving element.

23. In a lubricant feeder a nozzle comprising a tubular member having a discharge port and an outwardly flaring contact portion surrounding the discharge port and means adapted to extend partly around an element to be lubricated and guide the contact portion of the nozzle into cooperative relation therewith.

24. In a lubricant feeder a nozzle comprising a tubular member having a discharge port and a concavely spherical contact portion surrounding the discharge port and means extending beyond the contact portion and adapted to guide it into cooperative relation to an element to be lubricated while allowing relative universal movement therebetween.

25. In a lubricant feeder a nozzle comprising a tubular member having a discharge port and an outwardly flared contact portion surrounding the discharge port formed for lubricant tight engagement with a lubricant receiving element and means for guiding said contact portion into cooperative relation with such lubrcant receiving element while allowing universal movement therebetween.

26. In a lubricant feeder a nozzle comprising a tubular member having a discharge port and a concavely spherical contact portion surrounding the discharge port formed for lubricant tight connection with a lubricant receiving element and means for guiding said contact portion into cooperative relation with said lubricant receiving element and maintaining such relation while allowng universal movement therebetween.

27. In a lubricant feeder a nozzle comprising a tubular member having a discharge portion and an outwardly flared contact portion surrounding the discharge portion formed for quick detachable lubricant tight connection with a lubricant receiving element and a clamp member adapted to extend partly around an element to be lubricated and hold it in cooperative relation with said nozzle while allowing relative universal movement therebetween.

28. In a lubricant feeder a nozzle comprising a tubular member having a discharge port and a concavely spherical contact portion surrounding the discharge port formed for lubricant tight connection with a lubricant receiving element and means including a clamp member formed to fit over a headed nipple at any angle thereto and guide the nozzle into cooperative relation therewith.

29. In a lubricant feeder a nozzle comprising a tubular member having a discharge port and a contact portion surrounding the discharge port formed for quick detachable lubricant tight connection with a lubricant receiving element and means including a clamp member formed to fit over a headed nipple at any angle thereto and hold the nozzle in cooperative relation therewith while allowing universal movement thereof.

30. In a lubricating apparatus, the combination of a receiver and a filler comprising a lubricant reservoir and adapted to be applied to and to fill said receiver, one of said parts presenting a surface which is a zone of a sphere and the other presenting an annular surface cooperating therewith, and means to lock said parts together and to maintain a joint permitting relative turning movement about the center of said sphere, said parts presenting a separable coupling affording a conduit for the lubricant in its passage from said reservoir to said receiver.

31. In a lubricating apparatus, the combination of a receiver and a filler adapted to be applied to and to fill said receiver, said receiver and filler comprising separable coupling members having provision for attachment of one to the other in various angular relations of their longitudinal axes, and means for limiting rotation of one of said members about its said longitudinal axis with relation to the other member.

32. In a lubricating apparatus, the combination of a receiver and a filler adapted to be applied to and to fill said receiver, one of said parts presenting a head and a neck, said head having a surface which is a zone of a sphere, and the other part presenting an annular surface cooperating therewith to maintain a joint permitting a relative turning movement about the center of said sphere, and means embracing said neck and cooperating with said head to secure such other part thereto.

33. In a lubricating apparatus, the combination of a receiver having a head and a neck presenting a passage extending through said neck and having an inlet in said head; and a filler comprising two members, one adapted to engage said head at top and bottom, respectively, and to telescope relatively to each other in a direction transverse to said neck, one of said members presenting a passage adapted to communicate with said receiver passage.

34. In a lubricating apparatus, the combination of a receiver having a head and a neck presenting a passage extending through said neck and having an inlet in said head; and a filler comprising two members, one adapted to engage said head at top and bottom, respectively, and to telescope relatively to each other transverse to said neck, one of said members having means rendered effective by movement of such member in one direction transversely of said neck to cause said members to clamp said head therebetween, one of said members presenting a passage adapted to communicate with the passage in said receiver.

35. In a lubricating apparatus, the combination of a receiver having a head and a neck presenting a passage extending through said neck and having an inlet in said head; and a filler comprising two members, one adapted to engage said head at top and bottom, respectively, and to telescope relatively to each other transverse to said neck, one of said members having means rendered effective by movement of such member in one direction transversely to said neck to cause said members to clamp said head therebetween, said members presenting passages communicating with each other and one of said members communicating with the passage in said receiver.

36. In a lubricating apparatus, the combination of a receiver having a head and a neck presenting a passage extending through said neck and having an inlet in said head; and a filler comprising two relatively telescopic members having provision, by relative telescopic movement transversely of said neck, to clamp said head therebetween, and means normally to retain said members in a definite relative position with respect to their relative telescopic movement.

37. In a lubricating apparatus, the combination of a receiver having a head and a neck presenting a passage extending through said neck and having an inlet in said head; and a filler comprising two relatively telescopic members, having provision, by relative telescopic movement transversely of said neck, to clamp said head therebetween, and means normally to retain said members in a relatively extended position considered with respect to their relative, telescopic movement.

38. In a lubricating apparatus, the combination of a receiver having a head and a neck presenting a passage extending through said neck and having an inlet in said head; and a filler comprising two relatively telescopic members, having provision, by relative telescopic movement transversely of said neck, to clamp said head therebetween, and a spring means normally to retain said members in a relatively extended position considered with reference to their relative, telescopic movement, said spring means being adapted to yield and to permit such movement upon the application of the sufficient degree of force on one member relatively to the other.

39. In a lubricating apparatus, the combination of a receiver having a spherical head and a neck presenting a conduit extending through said neck and having an inlet in said head; and a filler comprising two relatively telescopic members, one presenting a socket to receive said head, and the other presenting surfaces adapted to embrace said neck and to cooperate with said head upon movement transversely of said neck and relatively to the first said member to urge the first said member into firm engagement with said head, said members presenting relatively telescopic conduits, communicating with each other and one being adapted to communicate with said conduit in said receiver.

40. A coupler for use in combination with a ball headed lubricant fitting comprising a pair of telescoping and relatively slidable sleeves, one of said sleeves being formed with a ball receiving socket for the reception of the ball head of said lubricant fitting and provided with fitting head and shank receiving openings disposed at a side and at an end thereof.

41. A coupler and lubricant nozzle for a ball-head lubrication fitting having a lubricant receiving duct through the head comprising, an outer sleeve having a head at one end and a ball receiving socket within said head in communication with a slot extending transversely of the axis of the sleeve, said head also having an opening through a side wall into said socket for passage of the ball-head of a fitting into said socket, said slot being of less width than the diameter of the ball-head of a fitting, an inner sleeve slidably mounted within the outer sleeve and having one end movable into said ball receiving socket, and means for urging said ends of said sleeves relatively toward one another for securing the ball-head of a fitting in said socket.

42. A coupler and lubricant nozzle for a ball-head lubrication fitting having a neck and a lubricant receiving duct through the head and neck comprising a sleeve having one end formed to provide an internal socket thereat for the reception of the ball-head of a fitting, said sleeve having an opening through a side wall into said socket for passage of the ball-head therethrough into the socket, said sleeve end having a slot extending partially thereacross transversely thereof and communicating with said socket and opening, said slot being of less width than the diameter of said ball-head and at least equal to the thickness of said neck of said fitting.

43. A coupler and lubricant nozzle for a ball-head lubrication fitting having a neck and a lubricant receiving duct through the head and neck comprising a sleeve having one end formed to provide an internal socket thereat for the reception of the ball-head of a fitting, said sleeve having an opening through a side wall into said socket for passage of the ball-head therethrough into the socket, said sleeve end having a slot extending partially thereacross transversely thereof and communicating with said socket and opening, said slot being of less width than the diameter of said ball-head and at least equal to the thickness of said neck of said fitting, and means slidably mounted in said sleeve for releasably securing the ball-head of a fitting in said socket and making a lubricant-tight seal with said ball-head.

44. A coupler and lubricant nozzle for a ball-head lubrication fitting having a neck and a lubricant receiving duct through the head and neck comprising a sleeve having one end formed to provide an internal socket thereat for the reception of the ball-head of a fitting, said sleeve having an opening through a side wall into said socket for passage of the ball-head therethrough into the socket, and means slidably mounted in said sleeve for releasably securing the ball-head of a fitting in said socket and making a lubricant-tight seal with said ball-head.

45. A grease feeder for a plurality of bearings having spherical lubricant-receiving ported members with port openings at various angles with the axes of said members comprising a source of lubricant supply, means for holding the supply member in engagement with a ported member to which it is applied, the joint face between the supply and ported member being of a circular form to permit the location of port openings in the bearings at said different angles.

46. A lubricant feeding device for detachable connection to a lubricant receiver comprising means for applying pressure to a lubricant in the feeding device, and a detachable connection for engaging the feeding device with the lubricant receiver comprising, means for drawing the feeder up tightly against the receiver but permitting slidable movement at the joint face of the feeder with the receiver.

47. A grease feeding system for a mechanism having a plurality of bearings with apertured projections at different points thereof comprising a rigid feeder member having means for making universal connections to said apertures for clearing obstructions, means for detachably connecting the free end of said feeder member with said apertures, and means for supplying lubricant under pressure to the other end of said feeder member.

48. The combination with a mechanism comprising a variety of bearings located at different points thereof, each bearing provided with an anperture for receiving lubricant, of means for supplying lubricant to said apertures comprising a lubricant feeder having means for forming different angular connections to said apertures for clearing obstructions without requiring flexure of said feeder, means for successively attaching the free end of said feeder to said apertures, and means for supplying lubricant under pressure to the other end of said feeder.

49. The combination with a coupler for quick-detachably connecting a lubricant source with a ball-head fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, of means for forcing lubricant through said inner sleeve, and a non-flexible connection between said forcing means and one of said sleeves.

50. The combination with a coupler for quick-detachably connecting a lubricant source with a ball-headed fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, of means for urging said shoulder and seat relatively in opposite directions, means for forcing lubricant through said inner sleeve, and a non-flexible connection between said forcing means and one of said sleeves.

51. The combination with a coupler for quick-detachably connecting a lubricant source with a ball-headed fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, of means for urging said shoulder and seat relatively apart, means for urging said shoulder and seat relatively toward one another, means for forcing lubricant through said inner sleeve, and a non-flexible connection between said forcing means and one of said sleeves.

52. The combination with a coupler for quick-detachably connecting a lubricant source with a ball-headed fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, of means for relatively drawing said shoulder and seat toward one another, means for forcing lubricant through said inner sleeve, and a non-flexible connection between said forcing means and one of said sleeves.

53. The combination with a coupler for quick-detachably connecting a lubricant source with a ball-headed fitting comprising inner and outer sleeve members, the outer sleeve member adapted at one end to project beyond the corresponding end of the inner sleeve member and having a shoulder adapted to engage a portion of the ball-head of a fitting, the inner sleeve having a concavely spherical seat about its said corresponding end for engaging the ball-head of the fitting, said shoulder and seat being substantially oppositely directed for reception of the ball-head of the fitting therebetween, of means for urging said shoulder and seat relatively in opposite directions, said urging means including a resilient element operative to effect relative movements between said shoulder and seat in one direction of relative movement therebetween, means for forcing said lubricant through said inner sleeve, and a non-flexible connection between said forcing means and one of said sleeves.

54. The combination with a lubricant receiving member having a lubricant receiving opening with a contact face about said opening, means for supplying lubricant to said receiving member comprising a nozzle member having a contact face, one of said contact faces presenting a circular edge and the other of said contact faces presenting a convex spherical portion, said edge and said spherical portion being cooperative to effect a seal therebetween from anyone of a plurality of angularly different positions.

55. In combination, a lubricant receiving fitting having an inlet opening encompassed by a contact face, means for supplying lubricant under pressure to said fitting through said opening, said means including a tubular member having a contact face at one end surrounding the passage therethrough, said contact faces being cooperative to maintain at least a line contact between the faces completely about said inlet opening to maintain a seal, one of said contact faces being of spherical contour whereby said line contact and therefore a seal may be effected from any one of a plurality of different angular relations between said fitting and tubular member.

56. In combination, a lubricant receiving fitting having an inlet opening encompassed by a contact face, means for suplying lubricant under pressure to said fitting through said opening, said means including a tubular member having a contact face at one end, surrounding the passage therethrough, said contact faces being cooperative to maintain contact between the faces completely about said inlet opening to maintain a seal, one of said contact faces being of spherical contour whereby said contact and therefore a seal may be effected from any one of a plurality of different angular relations between said fitting and tubular member.

57. The combination with a lubricant feeder, of a bearing for receiving the lubricant having a feeder connection member, the joining faces between the connection member and the feeder comprising a spherical joint face having a port within the face and a contact ring having a port within the ring, and means for holding these faces in contact through a range of varying angular positions with the port openings within the range of contact.

58. In combination a lubricant receiving member provided with a head having a bearing surface with a port therein, a lubricant supply member having a complementary bearing surface with a port adapted to register with the first port, a clamping member arranged to embrace said head, and manually controlled means for moving the clamping member with respect to the supply member to allow the application of the lubricant supply member to the receiving member and thereafter positively to clamp said members together.

59. In combination a lubricant receiving member provided with a head having a spherical bearing surface with a port therein, a lubricant supply member having a complementary bearing surface adapted to have universal movement with respect thereto and having a port adapted to register with the first port, a clamping member arranged to embrace said head, and manually controlled means for moving the clamping member with respect to the supply member to allow the application of the lubricant supply member to the receiving member and thereafter positively to clamp said members together while allowing universal motion therebetween.

60. The combination with means forming a lubricant bearing nipple, of a rigid supply means for the lubricant under pressure, nonflexible means connected with the lubricant supply means for engaging the nipple, the bearing nipple having ported attachment means disposed and pointing in any one of a plurality of different directions in addition to that in line with its axis so that the lubricant supply means may be applied thereto to clear an obstruction adjacent to the nipple without flexing the parts.

61. The combination with a lubricant nipple for a bearing of a source of lubricant supply, means adapted to connect the source of lubricant to the nipple, said nipple forming a universal joint with said connecting means and having a port arranged to register with the connecting means when the latter is applied thereto so that the connecting means may be free from flexure when coupled to said nipple in various angular relationships.

62. The combination with a mechanism comprising a variety of bearings located at different points thereof and at different angles, each bearing being provided with an aperture for receiving lubricant, of means for supplying lubricant to said apertures comprising nipples mounted on said bearings in said apertures, said nipples having ports opening at a plurality of different angles to clear obstructions, a quick-detachable universal clamping means for successively connecting a source of lubricant supply with each of said nipples, said clamping means comprising means for securing the connection between source and said nipples against the escape of lubricant, and means for applying pressure to the lubricant supplied to said nipples.

In witness whereof, I have affixed my signature.

WILLIAM L. MORRIS.